United States Patent [19]
Gray

[11] Patent Number: 5,602,843
[45] Date of Patent: Feb. 11, 1997

[54] INTEGRATED WIRED AND WIRELESS TELECOMMUNICATIONS SYSTEM

[75] Inventor: Thomas Gray, Carp, Canada

[73] Assignee: Mitel Corporation, Konata, Canada

[21] Appl. No.: 625,302

[22] Filed: Apr. 1, 1996

Related U.S. Application Data

[63] Continuation of Ser. No. 278,317, Jul. 21, 1994, abandoned.

[51] Int. Cl.⁶ .................................................. H04J 3/16
[52] U.S. Cl. ......................... 370/338; 379/60; 379/63; 455/33.1; 455/56.1; 370/402
[58] Field of Search .................. 370/95.1, 95.3, 370/94.1, 85.13, 60; 379/58, 59, 60, 61, 62, 63; 455/33.1, 33.2, 33.3, 33.4, 34.1, 56.1

[56] References Cited

U.S. PATENT DOCUMENTS

| | | | |
|---|---|---|---|
| 5,274,634 | 12/1993 | Dabiarz | 370/60 |
| 5,276,680 | 1/1994 | Messenger | 370/95.1 |
| 5,349,631 | 9/1994 | Lee | 455/33.1 |
| 5,353,331 | 10/1994 | Emery et al. | 379/60 |
| 5,390,233 | 2/1995 | Jensen et al. | 379/58 |

FOREIGN PATENT DOCUMENTS

| | | | |
|---|---|---|---|
| 0051029 | 5/1982 | European Pat. Off. | H04M 11/02 |
| 0595392 | 5/1994 | European Pat. Off. | H04Q 7/04 |

OTHER PUBLICATIONS

SpectraLink, Pocket Communications System, 1993 Sprectra Link Corporation 002.0393.C.

Primary Examiner—Benedict V. Safourek
Assistant Examiner—Shick Hom
Attorney, Agent, or Firm—Marks & Clerk

[57] ABSTRACT

An integrated telecommunications system includes a wired subsystem consisting of wired links for establishing communication with terminals connected thereto, a wireless subsystem consisting of a group of base stations for communicating over wireless links, and a common central switch for establishing interconnections between selected communications channels. A switching controller is connected to the central switch for controlling the establishment of interconnections between selected communication channels in the system. A group controller is connected to the central switch for ensuring message-based mobility management of the wireless subsystem independently of the first controller.

8 Claims, 3 Drawing Sheets

INTEGRATED WIRED AND WIRELESS TELECOMMUNICATIONS SYSTEM

This application is a continuation of application Ser. No. 08/278,317 filed on Jul. 21,1994 now abandoned.

BACKGROUND OF THE INVENTION

This invention relates to an integrated telecommunications system, and more particularly a system comprising wired and wireless subsystems.

PBX-base wired telecommunications systems, for example telephone systems, have been established in business premises for many years. These are now largely implemented in digital form using well-established technology. More recently, in order to provide additional mobility it has become desirable to associate these conventional wired systems with cellular wireless systems, usually employing RF links, that permit the users to carry portable hand sets on their person. Just as in the case of large scale commercial cellular systems, these local cellular systems employ RF base stations distributed throughout the premises and controlled so as to establish links with selected handsets in accordance with signal strengths. As the user moves around the building, a central controller ensures hand-off from one base station to another. Control of the system is accomplished by messages passed through the RF links from the hand sets to a controller via the base station and vice versa.

The base stations are placed around the building as a shared resource. It is clearly desirable to keep the number and complexity of base stations to a minimum in order to reduce overhead costs. Unfortunately, the RF medium is unstable. Environmental changes occur such that even a stationary terminal cannot be guaranteed a reliable connection to any specific base station. Fading may occur due to subtle environmental changes unrelated to any movement on the part of the user. This can necessitate hand-off from one base station to another or between different channels associated with the same base station. Of course, as the user moves about the building, hand-off becomes necessary as different base stations come into range.

The cellular subsystem must guarantee connection at all times to one base station, and hand-off must be imperceptible to the user. This requires that hand-off be done very quickly so that interruptions in service are limited to less than a few tens of milliseconds.

The control of the wireless subsystem to maintain reliable connections at all times to a base station is generally known as mobility management. There are various wireless protocols that support hand-off, but generally the hand sets are provided with connections on two different RF channels. One channel is used as the active channel with the other on standby in the event that the signal quality on the first channel degrades beyond a predetermined satisfactory level. These two channels can establish connections with different base stations or represent different RF channels associated with the same base station. The two channels should be selected in such a way that their characteristics differ sufficiently for simultaneous degradation on both channels to be unlikely so as to ensure the provision of satisfactory service.

A serious problem in wireless systems is known as a hard fade. Slight changes in the environment can cause the attenuation of a RF channel to vary by up to 100dB for practical purposes, instantaneously (in the order of microseconds) which is several orders of magnitude greater than the tens or hundreds of milliseconds representing the response time of a typical communication system. For a wireless system to provide a service comparable to that of a wired system, channel switching must occur sufficiently fast that no perceptible degradation will occur in the event of a hard fade. For practical purposes, in the case of speech this means that the switch must occur in less than 50 to 100 milliseconds if an unacceptable pop is not to be heard on the connection. Synchronization must be restored with an average maximum time of less than 50 ms for adequate user performance.

The 50 ms requirement is much too fast for a conventional communication system, such as a PBX. These systems, which share resources among users with various types of messaging and queuing schemes, cannot respond faster than around 500 ms for conventional signals, such as occur when a terminal goes off hook. Hand-offs generate far more messages, which require much faster response times.

Even if the problem of response time is overcome, users still expect wireless systems to offer all the features of a fully featured PBX. These include user-based features such as call forwarding and the ability to interface with LAN and ISDN systems. The user should be able to make a connection and receive any service in the wireless environment that can be received through the wired system. Existing wireless systems usually employ wireless controllers connected to the PBX through ONS line circuits or some form of high speed digital trunk. The PBX controls the wireless extensions in the same manner as an ordinary extension, with the wireless controller taking care of mobility. The Ericsson DCT900 and the Novatel Affinity are examples of such products. These treat the wireless system as a separate device connected by trunks. Access to the feature base is extremely limited since the features can be supplied only by trunk protocols of varying capability.

It has been proposed to isolate the PBX from the wireless control system since these domains have different requirements and require different solutions. However, the provision of a physically separate system for the wireless subsystem results in loss of flexibility of an integrated system and requires a significant degree of wiring duplication since the same physical wiring can no longer be shared. The provision of separate systems also results in the loss of the close degree of coupling possible between the wireless side and other subsystems that can be offered by an integrated system.

It has been suggested that base stations could be formed into groups using RF combiners. British Telecom has suggested a scheme whereby the RF from all the base stations is combined and carried back to a common pool of receivers at a central controller from each base station by a modulated optic fiber carrier. The optic fiber transports the RF from each base station back to a common RF selector.

RF based systems have a number of disadvantages. They do not allow different base stations to use the same frequencies since they have one set of receivers for all the RF channels in a group.

Such existing systems are only useful to voice only wireless subsystems since they cannot provide solutions similar problems in an integrated communications systems, such as LAN connectivity. The development costs of supporting these wireless applications on the PBX cannot support other applications. Furthermore, an integrated communications system should provide close coupling among all applications. For example, a user might wish to connect a wireless terminal to a LAN. The RF macro-cell does not assist as a solution to this problem.

SUMMARY OF THE INVENTION

An object of the present invention is to provide an integrated system that isolates the wired and wireless systems without losing the close coupling that a fully integrated system has to offer in terms of shared facilities and more integrated applications.

According to the present invention there is provided a PBX-based integrated telecommunications system comprising: a wired subsystem comprising wired links for establishing communication with wired terminals connected thereto; a wireless subsystem comprising a group of base stations, formed for communicating over wireless links to mobile terminals; a common central switch for establishing interconnections between selected communications channels and connected to said wired terminals and said base stations; a switching controller connected to said central switch for controlling the establishment of interconnections between selected communications channels in said system; a common group controller connected to said base stations through said central switch for exchanging control packets over a data link layer with said mobile terminals through said base stations to control said mobile terminals and thereby provide message-based mobility management of said wireless subsystem independently of said switching controller; and said base stations acting as multiplexers and forming a transparent encapsulation bridge connecting said data link layer between the mobile terminals and said group controller to permit the change of said control messages therebetween, said group controller further comprising means for sending and receiving control packets over said wireless links, means for monitoring the operation of each channel in said wireless links responsive to received control packets, and means for generating control packets for transmission over said wireless subsystem to control the operation thereof.

By forming the base stations into a message-based group, the common switch can set up the required interconnections between the wireless base stations and other parts of the system indifferently. The group controller handles the mobility management by sending messages over control channels from the base stations to the wireless terminals, which may be in the form of handsets.

The messages are preferably carried with a transport protocol, such as Gbus as described in Canadian patent application no. 2,058,654 or Packet Relay as described in U.S. Pat. No. 5,274,634, the contents of which are herein incorporated by reference.

A high speed message system is set up to link the separated and specialized controllers. The PBX controller regards the wireless devices as ordinary station sets. It can control these sets by using the mobility controller as a virtual peripheral device controller. It regards the wireless controller as just another peripheral controller and signaling between the two forms of controller is identical.

The mobility controller handles all of the problems of locating and tracing the wireless device while the PBX controller can supply the wireless device with all the PBX features.

Additionally the PBX can establish services which can link a user's wired and wireless set in a form of combined service which provides an entirely new set of service possibilities. For example, a proximity detector can be placed near the user's wired device. This detector can detect the presence of the wireless device. If the user is near his wired device (i.e. his desk) calls can be directed there. If he is away from his desk, the proximity device can instruct the PBX to route his calls to his wireless device automatically. Many other services are possible.

If desired, a common pool of transcoders, required for the conversion of compressed RF speech, can form part of a common pool of devices available to all applications in the system. The wireless subsystem does not require its own transcoder at each base station. The number of transcoders in the system can thus be minimized and cost savings achieved.

BRIEF DESCRIPTION OF THE DRAWINGS

The present invention will now be described in more detail, by way of example only, with reference to the accompanying drawings, in which.

DESCRIPTION OF THE PREFERRED EMBODIMENTS

Figure 1:
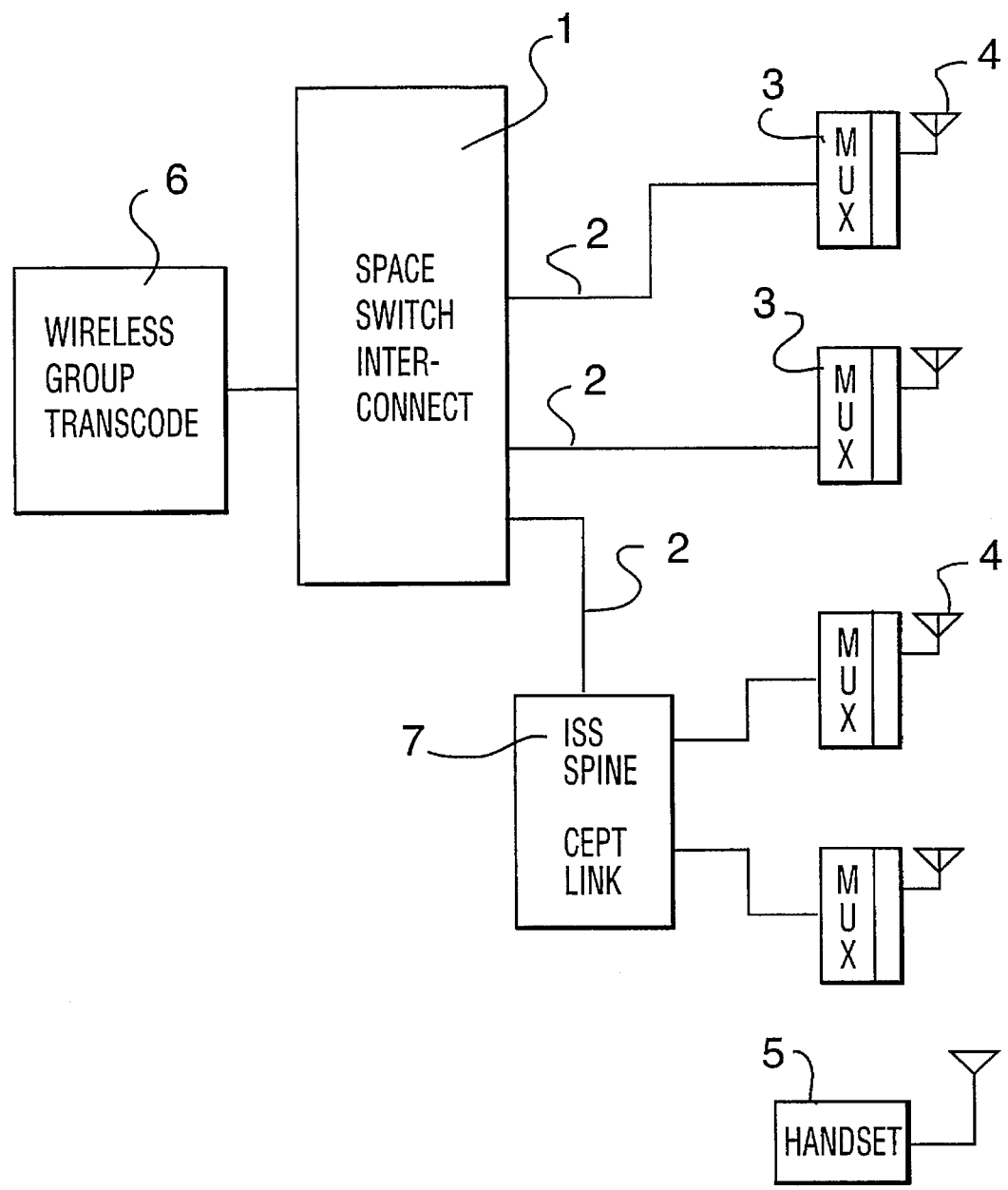
FIG. 1 is a block diagram of a message based wireless subsystem.

The message-based wireless subsystem shown in FIG. 1 comprises a space switch 1 connected over optic fiber links 2 to a plurality of base stations 3, each associated with an antenna 4. The base stations communicate over an RF link with mobile terminals 5, which are conveniently in the form of handsets. The base stations 3 collectively form a group controlled by group controller 6. This also provides transcoding functions to provide any required speech compression and decompression.

Some of the base stations 3 can be connected by an ISS spine and CEPT link. By grouping the base stations, a common switch can be used to set up the connections between the terminal units, but unlike the RF-based system, the use of a message based system does not preclude the possibility of different base stations using the same base RF frequencies.

In FIG. 1, the handsets are standard commercial handsets conforming to applicable standards. The mobility management for the entire system is carried out by the group controller 6, which provides control to all handsets.

Wireless systems are controlled by means of ISDN like HDLC messages to and from the hand set and the wireless controller. Hand-off is accomplished by either the hand set or the wireless controller selecting two RF channels for any active base station under the standard practice of the wireless standard. Using the standard, the RF channels will be monitored.

If the active channel degrades to an unacceptable level, a message will be sent indicating that the secondary channel is now to be used for active traffic. For acceptable human audio performance, this channel switch must be accomplished in 50 ms or less.

In operation, the base stations 3 act as multiplexers forming a transparent encapsulation bridge connecting the data link layer between the handsets 5 and the controller 6. Messages are transmitted using high speed messaging protocols, such as the Gbus as described in Canadian patent application no. 2,058,654 or Packet Relay as described in U.S. Pat. No. 5,274,634, the contents of which are herein incorporated by reference.

In the direction of transfer from a handset 5 to the controller 6, each base station monitors the RF protocol on the control channels. If a control packet in the RF from a base station is detected, the base station absorbs and buffers the packet. Upon its completion in the RF, the packet is encapsulated in a transport protocol packet and sent to the controller 6. The transport protocol identifies the packet by the identity of the RF channel. The controller 6 thus has the ability to monitor each RF control channel at each base station. This ability is provided by the multiplexing function of the transport protocol.

If a controller 6 wishes to send a control packet to a handset, it first identifies the base station and specific RF control channel to which the handset is connected. The controller then sends the packet to the handset by encapsulating it in a transport protocol packet.

This system solves the particular problems of cost of the base station and the problem of hand-off due to hard fades. The cost of the base station is reduced since control is removed from the base station and concentrated in a single location. Economies of scale can be achieved since only active handsets require control for all usages. The control can be sized for the expected total usage rather than requiring each base station to contain enough control.

The required speed for hard fades is also achieved since all handsets 5 communicate with only one controller. The controller will recognize a hand-off message and can easily set up the switching fabric for the newly active connection in the 50 ms time required. The alternative of providing a controller in each base station is not only more expensive than the described scheme but greatly complicates the problem of hand-off. The active and standby channels can be on separate base stations 4. At the time of hand-off, the previous standby base station has to signal the previously active base station. These controllers have to coordinate the changing of the transmission path so that the user perceives no degradation in performance. This cooperative task has to be accomplished in less than 50 ms. This requires complicated priority scheduling on each processor.

All circuit elements are connected to a central space switch. The interconnections for the transport protocol are set up within the bandwidth of the space switch as was described in U.S. Pat. No. 5,164,940, the contents of which are herein incorporated by reference.

Figure 2:
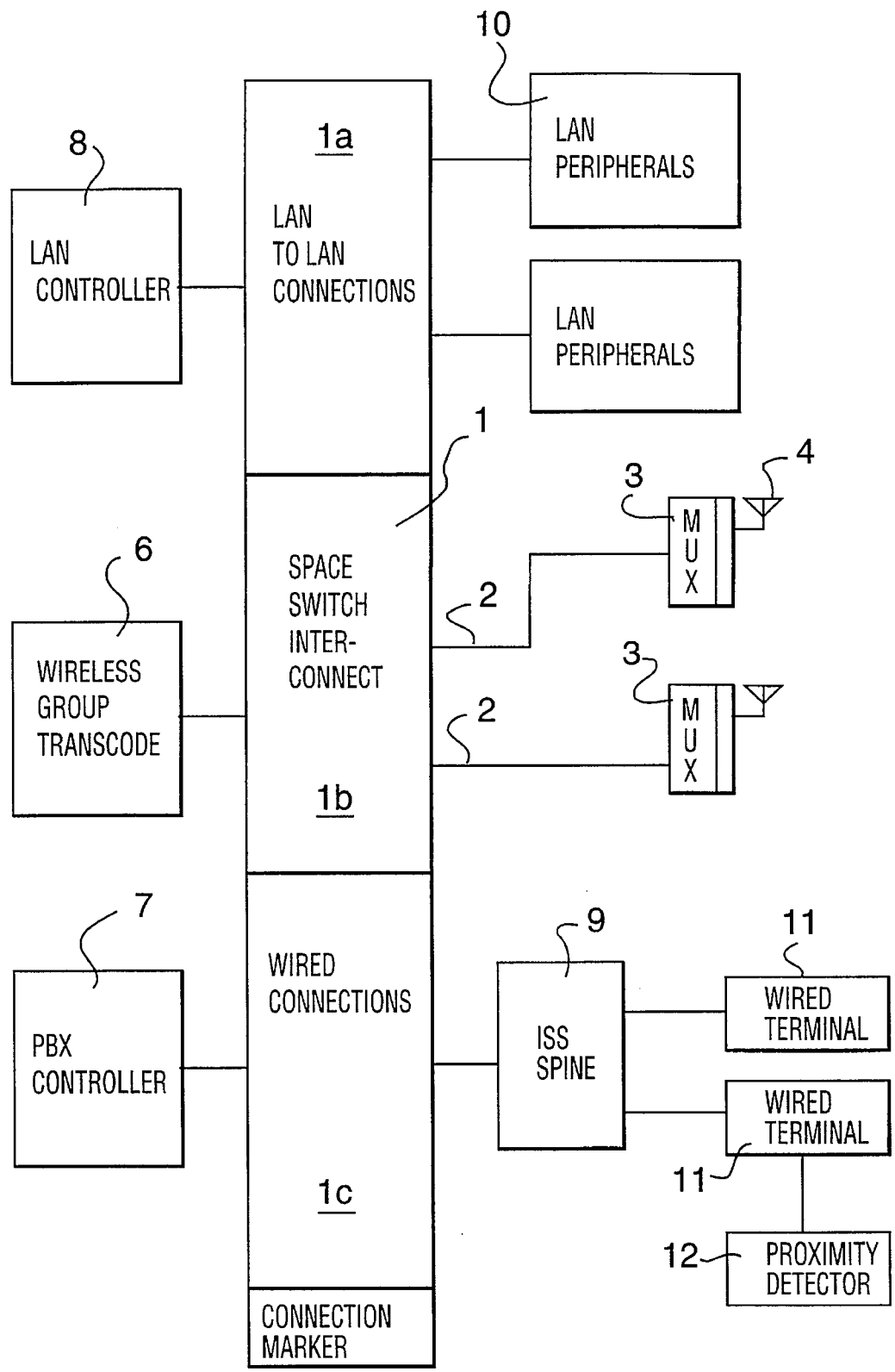
FIG. 2 is a block diagram of an integrated communication system.

The same or similar transport protocol can be set up to interconnect the controllers shown in FIG. 2. The wireless controller and PBX controller can cooperate in the provision of service to the wireless terminals. The wireless controller can perform the specialized service of mobility management. It can pass all non-mobility messages on to the PBX controller which can perform the basic call processing for the entire system of both wired and wireless terminals. The PBX controller service will be the same for both wired and wireless systems and so all features which can be given to wireless terminals can also be given to wired.

A similar argument can be provided for the LAN system shown in the figure. The wireless controller can provide the mobility management for a wireless data terminal connected to the system. The LAN controller can provide all connection management.

Referring now to FIG. 2, which shows the implementation of the invention within an integrated communication system. It will be seen that the space switch 1 is divided into three parts 1a, 1b, 1c for establishing LAN to LAN, wireless, and wired connections, and also of course connections between the three divisions 1a, 1b, 1c. The wired connections are controlled by a PBX controller 7 and the LAN connections by a LAN controller 8. Division 1a is connected to LAN peripherals 10, division 1b to multiplexers 3, and division 1c is connected to ISS spine 9 connected to wired terminals 11, for example telephone sets. One such terminal is associated with a proximity detector 12 for detecting the presence of a mobile terminal. This system can then be arranged so that when the presence of a mobile terminal is detected (i.e. because a subscriber is at his desk), calls are automatically routed to the wired terminal.

Figure 3:
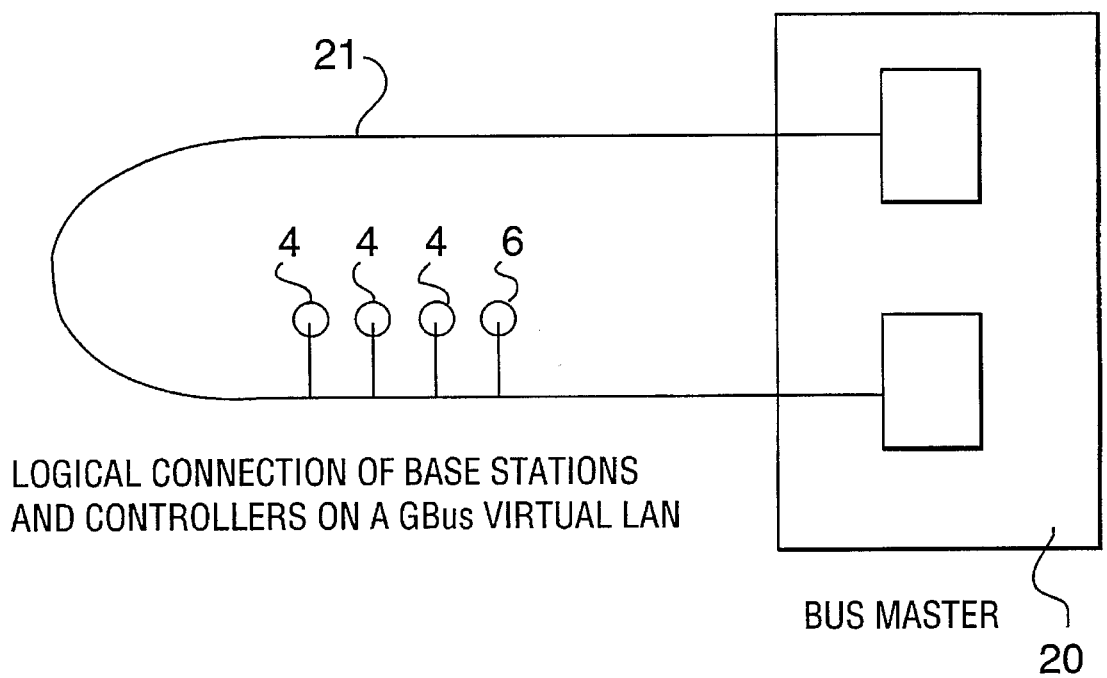
FIG. 3 shows the logical connection of base stations and controllers on a Gbus virtual LAN.

FIG. 3 shows the connection of base stations and controllers to a Gbus Virtual LAN. In FIG. 3 a bus master 20 is connected over a Gbus 21 to base stations 4 and controllers 6.

The system can easily be expanded to include multiple controllers on the same transport protocol bus. In this case, the number of base stations exceeds the control capacity of a single controller. Instead of moving to a more powerful controller, the scheme allows load sharing between two controllers. The problem of hand-offs between base stations on different controllers is tractable since any practical system can be sized to contain only a few controllers. Additionally a system can be engineered so that hand-offs between different controllers is unlikely. For example, one controller could handle all base stations in the lobby and lower floors of a building. The other controller could handle the upper floors. Hand-offs between these controllers will happen with far less frequency than hand-offs between base stations on a single controller.

If the transport protocol is insufficient, the system of FIG. 3 can be expanded to form two or more separate transport protocol systems. Bridges link the various transport protocol buses.

I claim:

1. A PBX-based integrated telecommunications system comprising:

a) a wired subsystem comprising wired links for establishing communication with wired terminals connected thereto;

b) a wireless subsystem comprising a group of base stations for communicating over wireless links to mobile terminals;

c) a common central switch for establishing interconnections between selected communications channels and connected to said wired terminals and said base stations;

d) a switching controller connected to said central switch for controlling the establishment of interconnections between selected communications channels in said system;

e) a common group controller connected to said base stations through said central switch for exchanging control packets over a data link layer with said mobile terminals through said base stations to control said mobile terminals and thereby provide message-based mobility management of said wireless subsystem independently of said switching controller; and f) said base stations acting as multiplexers and forming a transparent encapsulation bridge connecting said data link layer between the mobile terminals and said group controller to permit the exchange of said control messages therebetween, said group controller further comprising means for sending and receiving control packets over said wireless links, means for monitoring the operation of each channel in said wireless links responsive to received control packets, and means for generating said control packets for transmission over said wireless subsystem to control the operation thereof.

2. An integrated telecommunications system as claimed in claim 1, wherein the control packets are encapsulated in a Gbus transport protocol.

3. An integrated telecommunications system as claimed in claim 1, wherein the control packets are encapsulated in a packet relay transport protocol.

4. An integrated telecommunications system as claimed in claim 1, wherein comprising a common pool of transcoders for all subsystems in said system.

5. An integrated telecommunications system as claimed in claim 1, wherein said central switch is a space switch.

6. An integrated telecommunications system as claimed in claim 1, wherein said central switch is further connected to a LAN subsystem comprising a plurality of LANs interconnectable by means of said central switch, and a LAN controller is connected to said central switch for establishing connections therethrough between selected LANs.

7. An integrated telecommunications system as claimed in claim 1, wherein the mobility management of said wireless subsystem is effected by a plurality of said group controllers dividing the task between them.

8. An integrated telecommunications system as claimed in claim 1, further comprising a proximity detector in the vicinity of a wired terminal for detecting the presence of a mobile terminal, and means for routing calls to said wired terminal when said mobile terminal is detected.

* * * * *